United States Patent

Nakayama et al.

[11] Patent Number: 5,993,580
[45] Date of Patent: *Nov. 30, 1999

[54] PROCESS FOR MANUFACTURING A FILTER ELEMENT

[75] Inventors: Toshiaki Nakayama, Nishikamo-gun; Hideo Kamo, Chiryu; Yoshitaka Nishio, Nagoya; Tetsuro Okazono, Okazaki; Takanari Takagaki, Nagoya, all of Japan

[73] Assignee: Nippondenso Co., Ltd, Kariya, Japan

[*] Notice: This patent is subject to a terminal disclaimer.

[21] Appl. No.: 08/863,890

[22] Filed: May 28, 1997

Related U.S. Application Data

[62] Division of application No. 08/498,230, Jul. 5, 1995, Pat. No. 5,674,302.

[30] Foreign Application Priority Data

Jul. 12, 1994 [JP] Japan ................... P6-183850
Jul. 28, 1994 [JP] Japan ................... P6-197594

[51] Int. Cl.$^6$ .................................... B29C 53/22
[52] U.S. Cl. .................... 156/62.6; 156/148; 156/221; 264/296; 264/320; 264/DIG. 48
[58] Field of Search .................... 264/119, 138, 264/DIG. 48, 296, 324, 320; 55/511, 521, DIG. 5; 156/62.6, 148, 221

[56] References Cited

U.S. PATENT DOCUMENTS

| | | |
|---|---|---|
| 1,890,499 | 12/1932 | Davies . |
| 2,080,154 | 5/1937 | Strindberg . |
| 2,398,045 | 4/1946 | Schaaf . |
| 3,017,698 | 1/1962 | Hambrecht et al. ............. 264/DIG. 48 |
| 3,410,062 | 11/1968 | Hart . |
| 4,151,095 | 4/1979 | Wright . |
| 4,512,891 | 4/1985 | Wright . |
| 4,636,231 | 1/1987 | Thornton . |
| 4,701,197 | 10/1987 | Thornton . |
| 4,725,296 | 2/1988 | Kurotobi . |
| 4,861,359 | 8/1989 | Tettman . |
| 4,961,974 | 10/1990 | Jones . |
| 4,976,677 | 12/1990 | Siversson . |
| 5,167,740 | 12/1992 | Michaelis . |
| 5,397,632 | 3/1995 | Murphy . |
| 5,674,302 | 10/1997 | Nakayama et al. ............. 55/385.3 |

FOREIGN PATENT DOCUMENTS

| | | |
|---|---|---|
| 490169 | 6/1996 | European Pat. Off. . |
| 1105703 | 12/1955 | France . |
| 2137309 | 2/1973 | Germany . |
| 4004343 | 8/1991 | Germany . |
| 85561 | 7/1976 | Japan . |

Primary Examiner—Jan H Silbaugh
Assistant Examiner—Edmund H. Lee
Attorney, Agent, or Firm—Pillsbury Madison & Sutro

[57] ABSTRACT

A filter element has a wavy filter portion including a plurality of ridges of a filter material, which are juxtaposed to one another and closed at their sides, and a flange portion extending along a mounting plane around the filter portion for supporting the filter portion. The flange portion is made of the same filter material extending from the filter portion, by compressing the filter material more densely than the filter portion. The filter element is manufactured by a step of preparing an intermediate product of a wavy sheet, and a step of forming the filter portion by leaving the central portion of the wavy intermediate product as in the wavy sheet, and forming the flange portion around the filter portion for supporting the filter portion, by pressing the side portions of the ridges of the wavy intermediate product along the mounting plane.

27 Claims, 12 Drawing Sheets

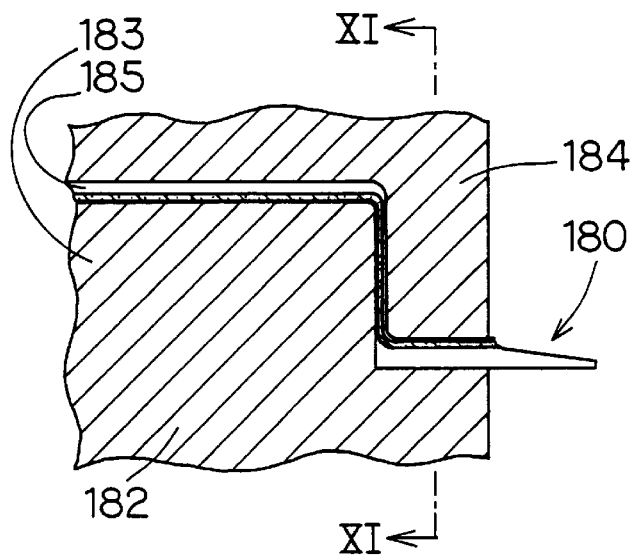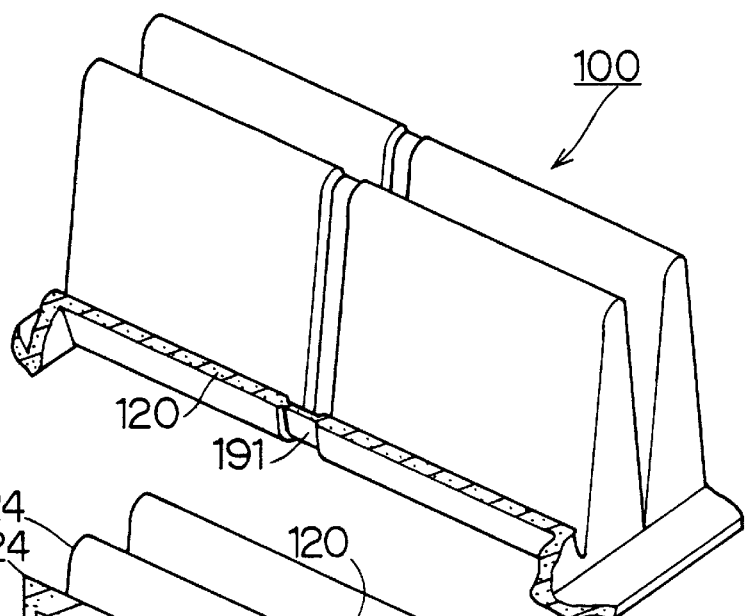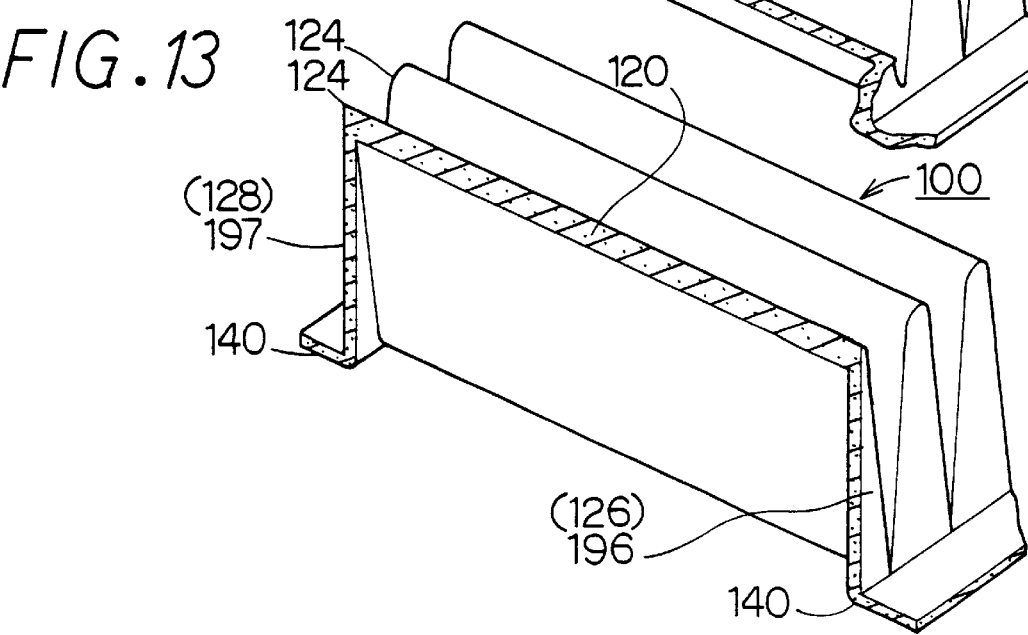

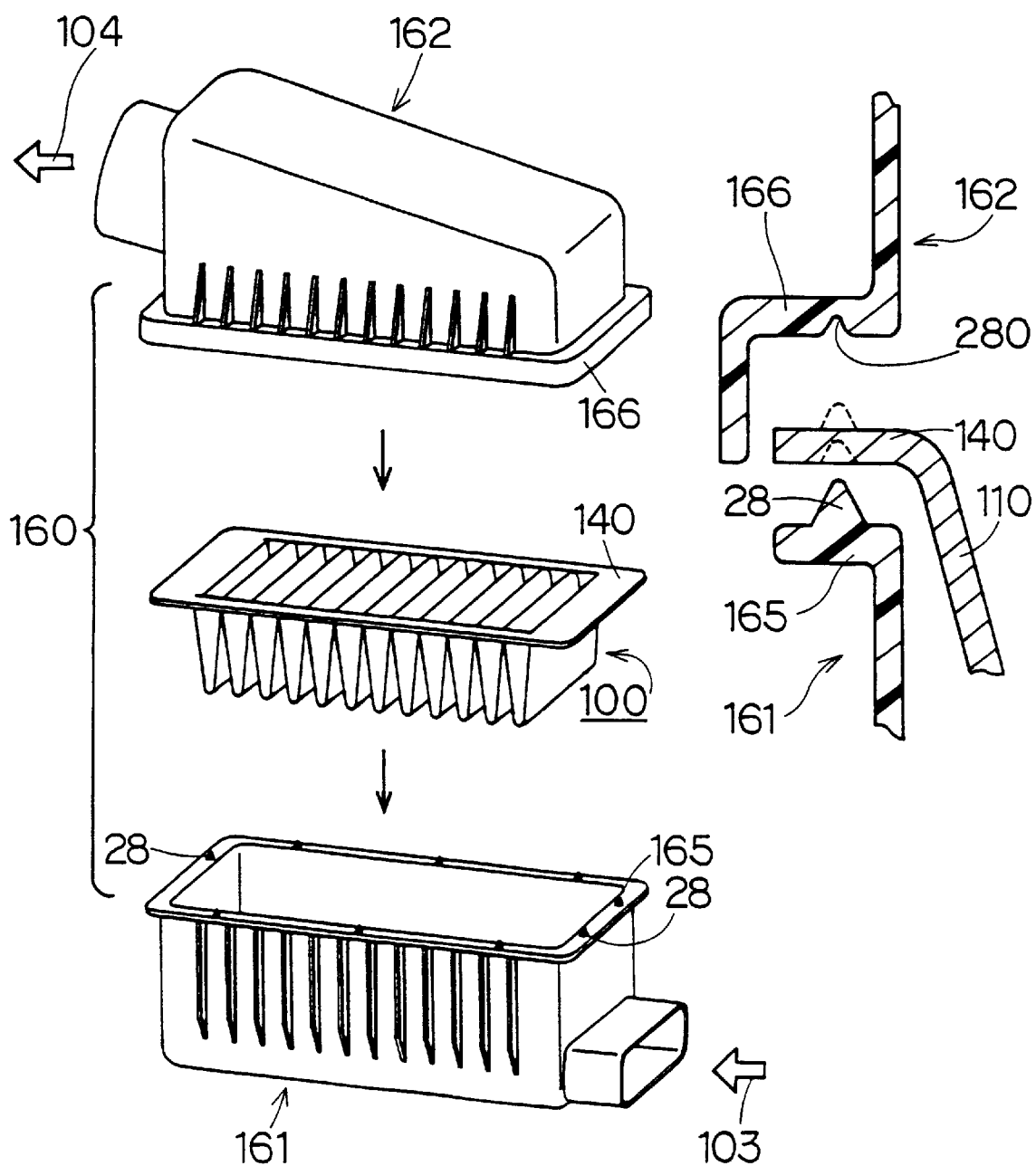

FIG. 23
FIG. 24
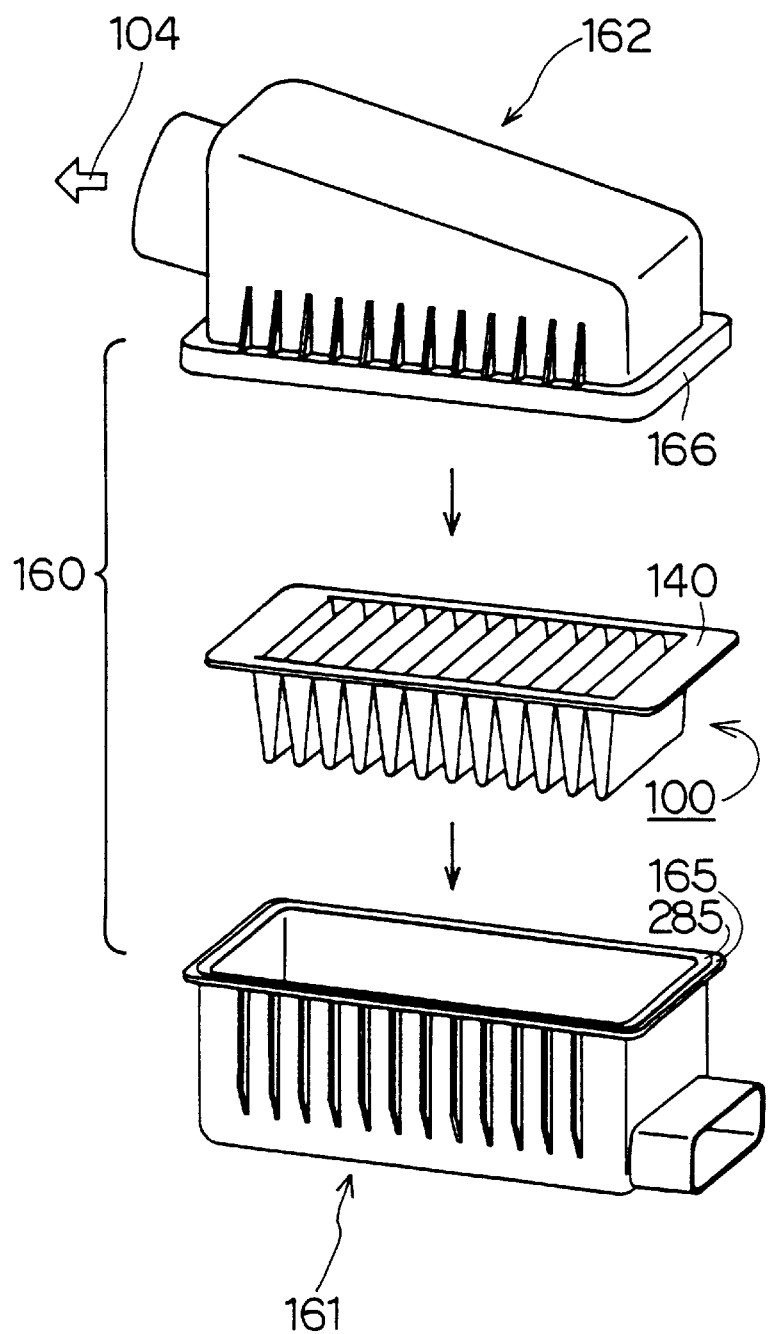
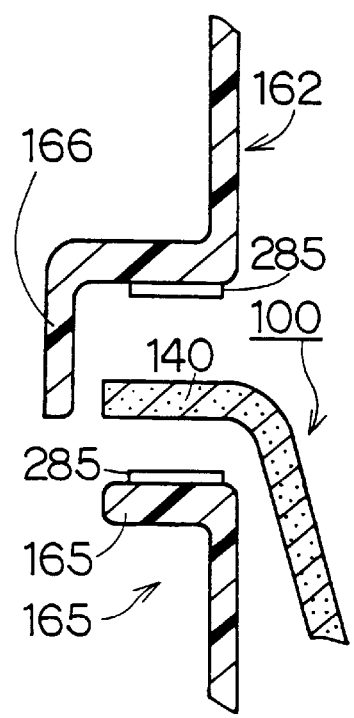

PROCESS FOR MANUFACTURING A FILTER ELEMENT

This is a division of application Ser. No. 08/498,230, filed Jul. 5, 1995, now U.S. Pat. No. 5,674,302.

CROSS REFERENCE TO RELATED APPLICATIONS

This application is based on and claims priorities of Japanese Patent Applications No. 6-183850 filed on Jul. 12, 1994 and No. 6-197594 filed on Jul. 28, 1994, the contents of which are incorporated herein by reference.

BACKGROUND OF THE INVENTION

1. Field of the Invention

The present invention relates to a filter element and a process for manufacturing the same for utilization in an air cleaner for an internal combustion engine of an automobile.

2. Description of Related Art

With a view to improve the filter area and the strength, to reduce the price and to facilitate the material recycle, a variety of filter elements have been proposed conventionally.

In Japanese Patent Application Laid-Open No. 51-85561, for example, there has been disclosed a technique by which a cup-shaped filter portion and a flange portion around the outer periphery of the filter portion are formed of paper. In this prior art, moreover, the filter portion is given a necessary strength by forming thick and thin portions.

In Japanese Patent Application Laid-Open No. 6-57293, on the other hand, there has been disclosed an element in which a wavy sheet filter material and a cotton filter material are laminated. According to this technique, it has been proposed to form a flange portion for supporting the filter, by closing the side faces of the wavy sheet with the cotton filter material and by compressing the cotton filter material.

In Japanese Patent Laid-Open No. 6-315604, on the other hand, there has been a proposal for closing the wavy sheet side faces by pressing down the waves at the side faces of the wavy sheet filter material.

In European Patent Publication No. 049016B1, on the other hand, there has been a proposal for adhering or welding a separate flange portion to a wavy sheet filter material.

These techniques are effective for facilitating the recycling because the wavy sheet filter portion and the enclosing portion are made of a similar material.

According to the technique of Japanese Patent Application Laid-Open No. 51-85561, however, it has been difficult to enhance only the strength of the flange portion. According to the technique of Japanese Patent Application Laid-Open No. 6-57293, on the other hand, there is a problem that the manufacture process is complicated because two kinds of different materials, i.e., the wavy material and the cotton-shaped material are required. Because of the construction having the cotton-shaped filter material positioned upstream, moreover, another problem is that it is difficult to retain a sufficiently wide filter area. Still moreover, since the flange portion is formed by pressing only the wavy sheet filter material and the cotton-shaped filter material to be doubly laminated, still another problem is that a high rigidity cannot be obtained from the flange portion.

According to the technique of Japanese Patent Application Laid-Open No. 315604/1994, on the other hand, the flange portion for supporting the filter element in the housing has to be separately prepared and adhered.

According to the technique of European Patent Publication No. 049016B1, on the other hand, since the flange portion is separately prepared and adhered, there has been a drawback in the complicated manufacture process and in the increase in the number of parts.

SUMMARY OF THE INVENTION

In view of the aforementioned problems of the prior art, the present invention has an object to provide a filter element which can be easily manufactured.

Another object of the present invention is to provide a filter element which is excellent in the filtering performance and simple in manufacture.

A further object of the present invention is to provide a filter element, the filter portion of which has a wide filter area and can be supported by a simple structure.

A further object of the present invention is to provide a filter element which can easily form a flange portion extending around the filter portion for supporting the same.

A further object of the present invention is to provide a filter element having a highly rigid flange portion.

A further object of the present invention is to provide a simple process for manufacturing the filter element.

According to a major construction of the present invention, a wavy filter portion having a wide filter area and a flange portion for supporting the former are formed of a continuing identical filter material. As a result, a filter element having an excellent filtering performance is provided by the simple construction while minimizing the addition of a material of different quality, and the flange portion is given a necessary strength.

Preferably, the flange portion may desirably be formed by laminating the filter material.

It is also preferred to give the necessary strength by forming reinforced portions in the portions of the filter portion and/or the flange portion.

According to another major construction of the present invention, moreover, a wavy sheet portion, closed portions and a flange portion are formed of a continuing identical filter material. As a result, it is possible to provide a simple construction which can have a wide filter area while minimizing the addition of a material of different quality. Especially the flange portion is formed in high density by laminating the filter material so that it is given a strength necessary for supporting the wavy sheet portion and the closed portions.

According to a manufacture process featuring the present invention, still moreover, after a sheet filter material is formed into a wavy intermediate product, the central portion of the wavy intermediate product is left as it is to form a filter portion, and the ridges of the wavy intermediate product are pressed at their sides to form a flange portion for supporting the filter portion. According to this manufacture process, it is possible to form the filter element having a wide filter area in a simple manner. Moreover, the flange portion is formed by pressing the side portions of the wavy intermediate product so that it is provided with a high rigidity necessary for supporting the filter portion.

Preferably, the flange portion may desirably be formed by laminating the filter material.

BRIEF DESCRIPTION OF THE DRAWINGS

FIG. 10 is a sectional view for explaining the forming step of FIG. 4;

FIG. 11 is a sectional view taken along line XI—XI of FIG. 10;

FIG. 12 is a partially broken view showing an element according to a second embodiment;

FIG. 13 is a partially broken view showing an element according to a third embodiment;

FIG. 21 is an exploded perspective view showing an air cleaner using the element of the present invention;

FIG. 22 is a sectional view showing a portion of the case and cap of FIG. 21 in detail;

FIG. 23 is an exploded perspective view showing an air cleaner using the element of the present invention;

FIG. 24 is a sectional view showing a portion of the case and cap of FIG. 23 in detail.

DETAILED DESCRIPTION OF THE PREFERRED EMBODIMENTS

Here will be described various embodiments in which the present invention is applied to an air filter. This air filter can be used for an internal combustion engine and applied to an automobile or a ship.

The first embodiment will be described with reference to FIGS. 1 to 11.

Figure 1:
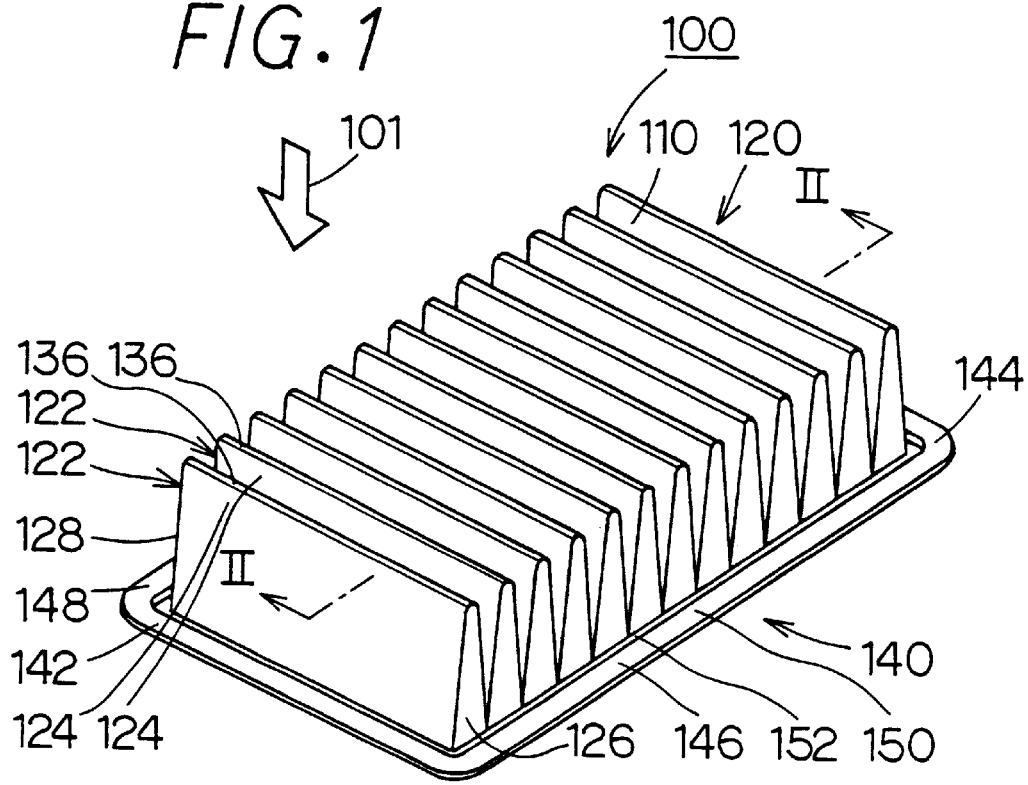
FIG. 1 is a perspective view showing an element according to a first embodiment of the present invention.

FIG. 1 is a perspective view showing an air cleaner element of the first embodiment. This air cleaner element 100 is composed of a filter portion 120 of a wavy sheet, and a flange portion 140 framing the filter portion 120. These filter portion 120 and flange portion 140 are made of an identical and continuous filter material 110. This filter material 110 is an nonwoven fabric of chemical fibers. Moreover, the filter material 110 is made by mixing main fibers and adhesive fibers. Of these, the main fibers can be exemplified by polyester fibers, and the adhesive fibers are desired, from the advantage in the manufacture, to be those which are melted when heated to come into contact with one another so that they are adhered to one another. These adhesive fibers can be exemplified by those which are prepared by coating the main fibers with a material having a lower melting point than that of the main fibers. Suitable adhesive fibers are polyester fibers which have their surfaces coated with a modified polyester having a lower melting point than that of the polyester fibers. Moreover, the filter material 110 is given a multi-layer structure in which the fiber density is thinner toward the upstream and denser toward the downstream, as taken in the flow direction of air indicated by an arrow 101.

The filter portion 120 is formed into a wavy sheet so as to retain its filtering area. Each wave is formed of a bag-shaped portion 122 which is protruded from the plane of extension of the flange portion 140. The bag portion 122 is formed to have its ridge 124 has its two side portions 126 and 128 closed by the filter material. The filter portion 120 is formed by arranging the plurality of bag portions 122 in parallel.

The flange portion 140 frames the four rectangular sides of the outer periphery of the filter portion 120 and is made of the same filter material 110 as that of the filter portion 120. The filter material 110 is doubly folded at the sides 142 and 144 of the wavy sheet filter portion 120 at the ends of the wave juxtaposition. On the other hand, the filter material 110 is folded in multiple layers with the same wave pitch as that of the filter portion 120 at the wave end sides 146 and 148 of the wavy sheet filter portion 120. The features of these sides 142, 144, 146 and 148 will be described in more detail in the later-described manufacture process.

Figure 2:
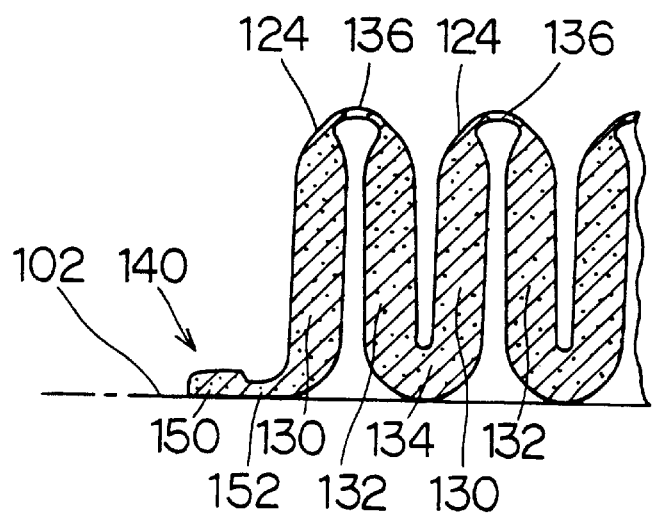
FIG. 2 is a sectional view of the element, as taken along line II—II of FIG. 1.

FIG. 2 is a sectional view schematically showing the thicknesses of the individual portions of the filter material 110 of the air cleaner element 100. FIG. 2 shows a portion of the II—II sectional view of FIG. 1.

The filter material 110 is made the thickest at two rising portions 130 and 132 of each ridge 124 and at the bottom 134 between the adjacent ridges. These thicknesses are substantially equal to or slightly smaller than those of the filter material 110 before being formed. Here, the closed side portions 126 and 128 of the two ends of each ridge 124 are given a similar thickness and accordingly a permeability required for the air cleaner.

In FIG. 2, there is presented a virtual plane 102 in which extends the flange portion 140. The filter material 110 is pressed at a high temperature along the edge of the crest of each ridge 124 so that it is densified to form a thin but hard reinforced portion 136. This reinforced portion 136 is pressed to such a density that it substantially completely loses the original permeability of the filter material 110.

The flange portion 140 is composed of a seal portion 150 framing the outer periphery, and a reinforced portion 152 formed inside of the seal portion 150. This seal portion 150 is pressed at a high temperature so that it is formed thinner than the rising portions 130 and 132. The seal portion 150 is made harder than the rising portions 130 and 132 while retaining an elasticity, so that it has substantially no permeability. On the other hand, the reinforced portion 152 is pressed at a high temperature so that it is made thinner than the seal portion 150, and it is compressed to such a density as to substantially completely lose the original permeability of the filter material 110.

Figure 3:
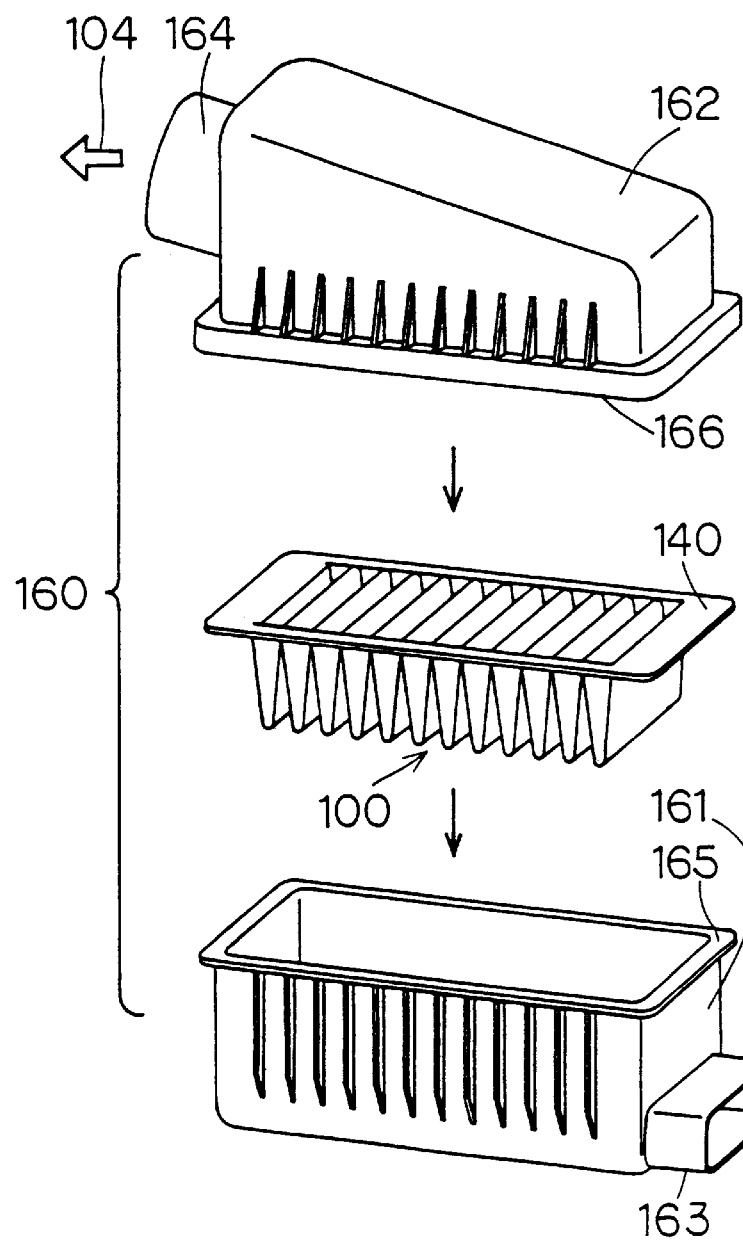
FIG. 3 is an exploded perspective view of an air cleaner in which is used the element of FIG. 1.

FIG. 3 is an exploded perspective view showing an air cleaner 160 for an internal combustion engine. Arrows 103 and 104 indicate the flow directions of the air to be sucked into the internal combustion engine.

The air cleaner 160 is constructed of a case (dusty side housing) 161 and a cap (clean side housing) 162. To a joint tube 163 which is formed on the case 161 to act as an inlet, there is connected an intake duct. To a joint tube 164 which is formed on the cap 162 to act as an outlet, on the other hand, there is connected an intake duct which is led to the internal combustion engine. Between the case 161 and the cap 162, there is mounted the aforementioned element 100. This element 100 is held and fixed by having its outer peripheral flange portion 140 clamped by the housing clamping portions 165 and 166 of the case 161 and the cap 162. In this embodiment, the clamping portions 165 and 166 define the mounting plane, and the flange portion of the aforementioned filter element 100 is shaped to extend along that mounting plane.

Here will be described a process for manufacturing the aforementioned element 100.

Figure 4:
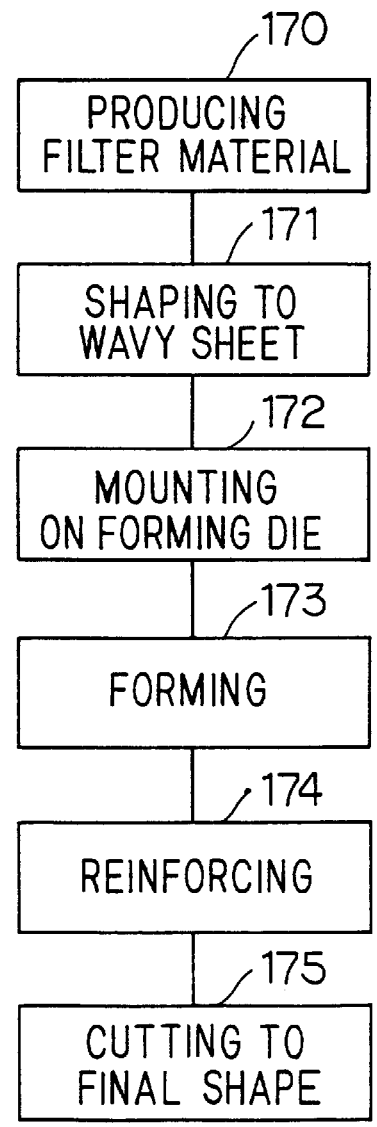
FIG. 4 is a flow chart for explaining a process for manufacturing the element of FIG. 1.
Figure 5:
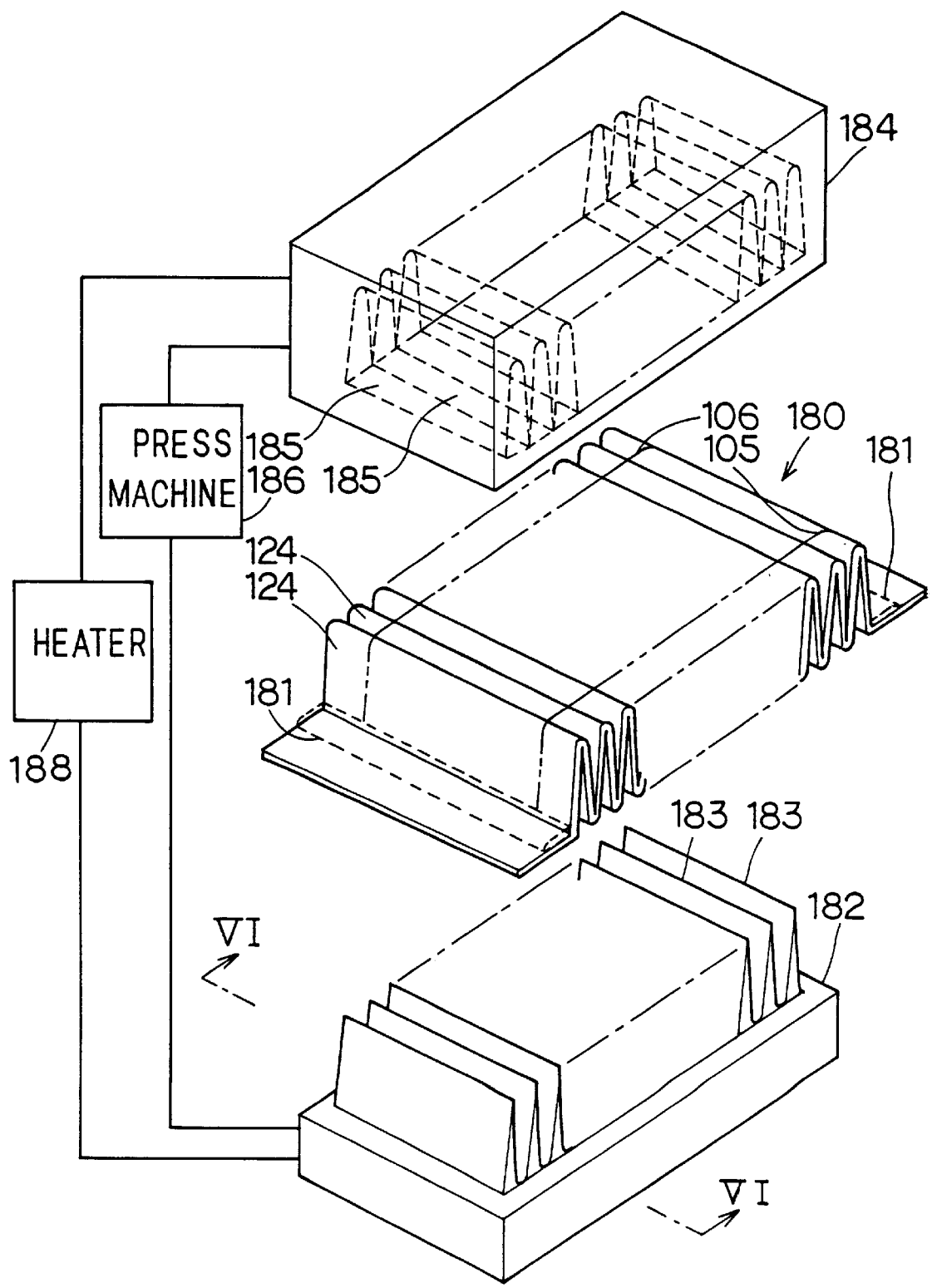
FIG. 5 is an exploded perspective view for explaining the forming step of FIG. 4.

FIG. 4 is a flow chart for explaining the steps of manufacturing the element 100. FIG. 5 is a perspective view for explaining an essential portion of the manufacture process. FIGS. 6 to 11 are sectional views for explaining the procedures of the forming steps.

At first Step 170, the filter material 110 is produced. This filter material 110 is produced by laminating layers of different fiber densities and by binding the fibers of the layers by the needle punch method. The filter material 110 is formed into a plate shape for a next step.

At next Step 171, the plate-shaped filter material 110 is shaped into a wavy sheet. At this step, the plate-shaped filter material 110 is pleated or folded in a wavy shape at its middle portion excepting its two end portions. At this step, the filter material 110 is folded into the wavy sheet while being heated to such a temperature as to melt only the adhesive fibers but not the main fibers thereof. As a result, the wavy shape is fixed. The filter material 110 after this step is given the shape of an intermediate product 180, as shown in FIG. 5.

At next Step 172, the intermediate product 180 is mounted in a forming die. At this step, the intermediate product 180 is mounted on a lower forming die 182. This lower forming die 182 is formed with a plurality of projecting plates 183 which are arranged in parallel and which are to be fitted in the insides of the ridges 124 of the intermediate product 180. At this mounting time on the lower forming die 182, moreover, the flat portions 181 of the two ends of the intermediate product 180 are doubly folded and overlapped, as indicated by broken lines in FIG. 5.

At next Step 173, the intermediate product 180 is deformed and formed into substantially the same shape as the final shape of the filter element. At this step, the intermediate product 180 mounted on the lower forming die 182 is formed by an upper forming die 184. A press machine 186 mounting the lower and upper forming dies 182 and 184 is operated to press and deform the intermediate product 180, and the two forming dies 182 and 184 are heated by a heater 188. This heating temperature is at a level to melt only the adhesive fibers but not the main fibers of the filter material 110. The upper forming die 184 is formed therein with a plurality of grooves 185 which are arranged in parallel and given a shorter length in the sidewise direction thereof than that of the ridges 124 of the intermediate product 180. As a result, the central portion of the intermediate product 180 is left in the wavy shape. On the other hand, the two side portions of the intermediate product 180 at the sides outer than double-dotted lines 105 and 106 are folded along the sides of the ridges 124, and the further outer portions are clamped and gradually pressed between the two dies 182 and 184. Moreover, the flat portions 181 are also pressed. Thus, the flange portion 140 is formed.

This forming step will be described in more detail.

Figure 8:
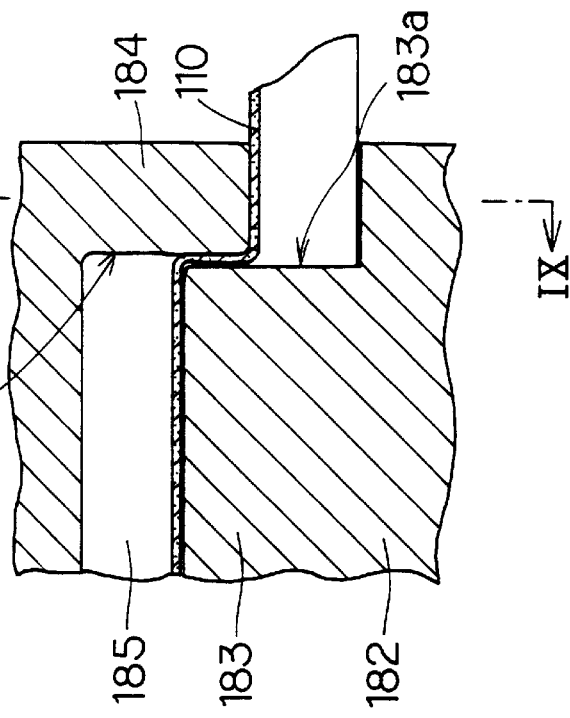
FIG. 8 is a sectional view for explaining the forming step of FIG. 6.
Figure 9:
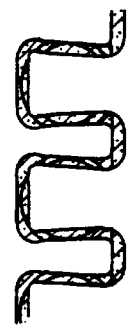
FIG. 9 is a sectional view taken along line IX—IX of FIG. 8.
Figure 6:
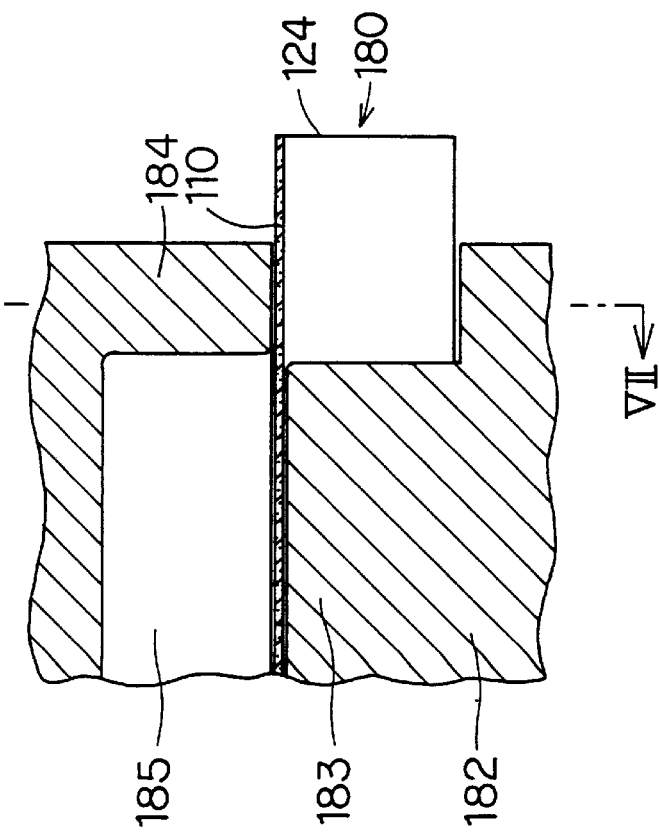
FIG. 6 is a sectional view for explaining the forming step of FIG. 4.
Figure 7:
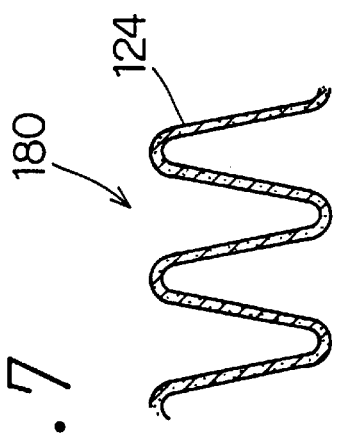
FIG. 7 is a sectional view taken along line VII—VII of FIG. 6.

FIGS. 6, 8 and 10 are sectional views showing partially a portion, as taken along line VI—VI of FIG. 5. FIGS. 7, 9 and 11 are sectional views showing the shapes of the filter material at the individual steps.

FIG. 6 shows the state immediately before the start of forming the intermediate product 180. The side portion of the intermediate product 180 largely bulges out from the forming dies 182 and 184. The filter material 110 in this state has a shape in the VII—VII sectional view, as shown in FIG. 7. From this state, there gradually moves down the upper forming die 184.

FIG. 8 shows the state immediately after the start of forming the intermediate product 180. Between a side face 185a defining the grooves 185 of the upper forming die 184 and a side face 183a of the projecting plate 183 of the lower forming die 182, there are clamped the side portions of the filter material, which protrude to the two sides of the forming dies 182 and 184. This shown state is established such that the filter material 110 is folded and then gradually pulled between the side face 185a and the side face 183a as the upper and lower forming dies 184 and 182 approach. At this time, the space between the side faces 185a and 183a is formed into a triangle so that the filter material is forced into that triangular space. At this time, the filter material is not only pressed while packing the gaps between the fibers but also formed with small pleats to form the closed side faces 126 and 128. At this time, the filter material is crushed into an Ω (omega) shape in the IX—IX sectional view, as shown in FIG. 9.

When the upper forming die 184 is further moved downward, the state of FIG. 10 is reached. FIG. 10 shows the state immediately before the end of forming the intermediate product 180. The filter material is forced into the space between the side face 185a and the side face 183a. In the sectional view XI—XI, moreover, the filter material is folded and pressed, as shown in FIG. 11. As a result, in the flange portion at the sides of the filter portion, the filter material is repeatedly laminated, as shown in FIG. 11, so that this repetition has a pitch corresponding to that of the ridges of the filter portion.

At this step, moreover, the forming dies 182 and 184 are heated so that the filter material is formed into the shape of the cavity in the forming dies and keeps its shape.

Moreover, the forming dies 182 and 184 have their gap reduced in the outer periphery of their forming portions to heavily compress the portions corresponding to the flange portion 140. Especially at the portions corresponding to the sides 146 and 148, the ridges 124 are pressed into at least three layers of the filter material, as shown in FIG. 11, to provide a high rigidity. Moreover, the portions corresponding to the sides 142 and 144 are also doubly folded into two layers of the filter material, as has been described with reference to FIG. 5, to provide a high rigidity.

After the forming step 173 described, the molding is extracted from the forming dies, and the procedure advances to Step 174 for reinforcement. At this reinforcing step, the reinforced portions 136 are formed along the top edges of the ridges 124, and the reinforced portions 152 are formed all over the inner periphery of the flange portion 140. Here, the dies are heated to such a high temperature as to melt the main fibers so that it melts the filter material 110 to form the reinforced portions.

At subsequent Step 175 for cutting operations, the outer peripheral portions corresponding to the flange portion 140 are cut to the final shape, as shown in FIG. 1.

Thus, the element 100 shown in FIG. 1 is manufactured.

The element 100 thus far described is formed of the common material in which the filter portion 120 and the flange portion 140 for supporting the filter portion 120 in the housing are continuous, so that it has a simple construction.

Moreover, the filter portion 120 has the wavy shape to retain a wide filter area.

Moreover, since the press-forming step using the forming dies 182 and 184 is adopted after the wavy intermediate product and since the two side portions of the ridges 124 are pressed to form the flange portion 140, this flange portion 140 can be formed by the simple manufacture process. Still moreover, the two side portions 126 and 128 of the ridges 124 are closed by folding and compressing the filter material, the element 100 having a wide filter area can be manufactured by the simple manufacture process. Due to the adoption of the forming step without being accompanied by a shearing step of the filter material, it is possible to prevent the original or intrinsic filtering performance of the filter material from being partially deteriorated.

Moreover, the desired shape can be kept without requiring any additional material of different quality such as a hard resin to be insert-molded. This effect appears prominent partly because the flange portion 140 is formed of the multi-layered filter material and partly because the reinforced portions 136 and 152 are provided. Of these, the reinforced portions 136 are effective to prevent any deformation of the filter portion 120 which is arranged transversely of the air passage.

Moreover, the elastic seal portion 150 is formed of the same filter material 110 at the outer circumference of the flange portion 140 so that the element 100 can be assembled with the case and cap 161 and 162 without any special seal member such as seal rubber.

The first embodiment has been described in case the two sides of the individual ridges 124 of the wavy portion of the rectangular filter material are pressed to form the flange portion 140. However, the present invention can be modified such that after the wavy filter material 110 has been curved in an annular or sector shape, the side portions of the ridges located in the periphery of the curved filter material may be pressed to form the flange portion.

In the foregoing first embodiment, on the other hand, the flange portion is given a function not as the portion for holding such a filter portion in the housing as is formed at the outer periphery of the filter portion but as the seal portion. However, the flange portion may be equipped with an additional seal member such as seal rubber. In this case, it is possible to adopt either the construction having the seal member fitted on the flange portion or the construction having the seal member fitted on the housing.

As the structure for improving the strength of the element, moreover, there may be adopted a shape of a second embodiment, as shown in FIG. 12. FIG. 12 is a partially broken view showing only a portion of the element. This element 100, as shown in FIG. 12, has a reinforced portion 191 along the direction of juxtaposition of the waves of the wavy filter portion. Here, this reinforced portion 191 is made thinner than the normal thickness of the filter material 110 of the filter portion 120, as shown in sectional view in FIG. 12, by having its main fibers melted and hardened.

As the structure for improving the strength of the filter element, still moreover, there may be adopted a shape of a third embodiment, as shown in FIG. 13. FIG. 13 is a partially broken view showing only a portion of the element. This element 100, as shown in FIG. 13, is formed with reinforced portions 196 and 197 by melting the main fibers of the two closed side faces 126 and 128 of the individual ridges 124 of the wavy filter portion to compress and harden them. The individual portions of the filter material of the element 100 are made thinner from the filter portion 120, the flange portion 140 and the closed side faces 126 and 128 in the recited order.

The reinforced portions 136, 152, 191, 126 and 128 thus far described may be adopted solely or in combination to reinforce the element suitably.

In the foregoing embodiments, on the other hand, the reinforced portions are formed independently of one another in the filter portion and the flange portion but may be formed to extend from the flange portion to the inside of the filter portion.

In the foregoing embodiments, on the other hand, the bag portions 122 are protruded to only one side from the plane of extension of the flange portion but may be alternately protruded to the two sides from the extension plane of the flange portion to form the wavy filter portion.

In the foregoing embodiments, on the other hand, the side portions of the intermediate product are pressed in the direction of height of the waves of the filter portion to simultaneously close the two sides of the ridges and form the flange portion. However, the ridges may be closed by deforming the filter portion in the direction of juxtaposition of the waves. In the foregoing embodiments, on the other hand, moreover, the two sides of the filter portion are opened on both sides from the crests to the bottoms of the ridges. At the step of forming the intermediate product, however, the filter material may be so deformed as to close the two sides of the bottoms of the ridges. If this construction is adopted, there can be attained an effect that the rigidity of the filter portion is enhanced, although the flexibility of the filter portion is deteriorated in the direction of the wave direction.

A filter and a fluid filter according to a fourth embodiment of the present invention will be described with reference to FIGS. 14 and 15.

Figure 14:
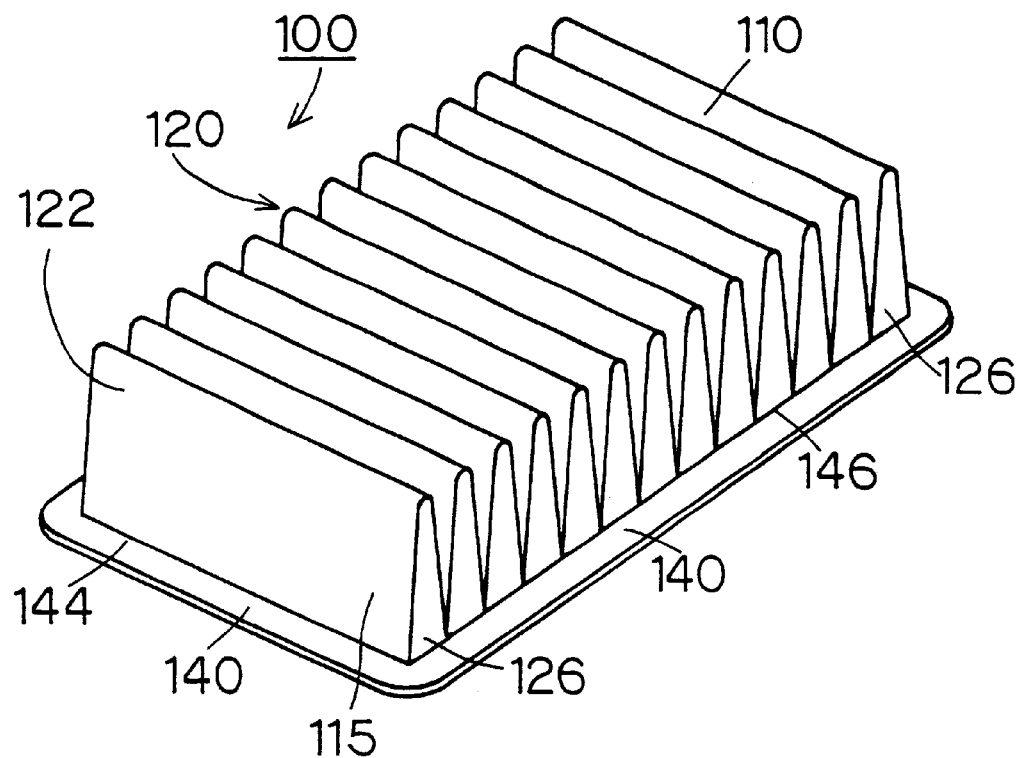
FIG. 14 is a perspective view showing an element according to a fourth embodiment of the present invention.
Figure 15:
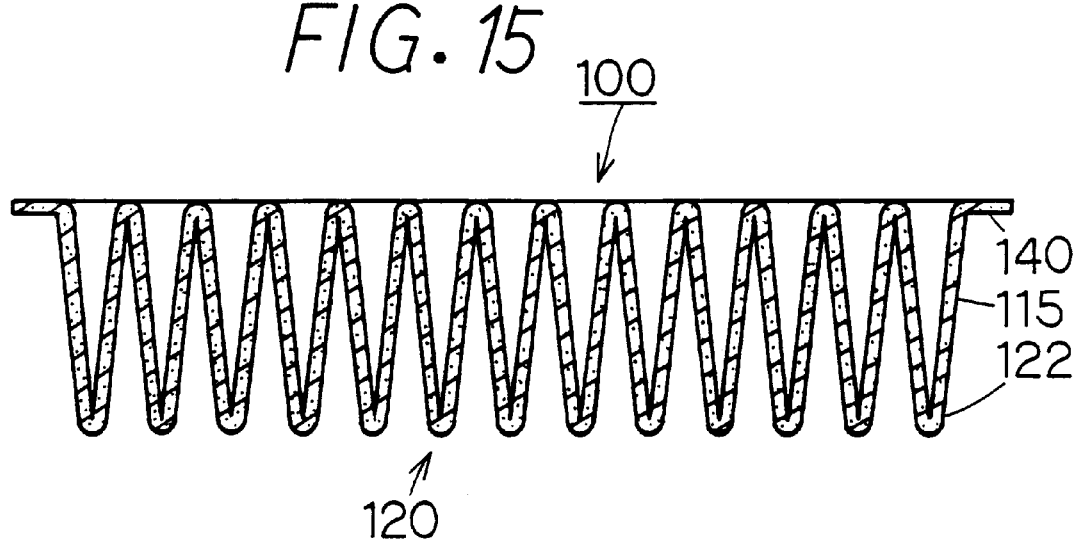
FIG. 15 is a sectional view showing a portion of the second embodiment.

As shown in FIGS. 14 and 15, the filter element 100 of the present embodiment is composed of the filter portion 120 made of the plurality of wave-shaped bag portions 122, and the flange portion 140 arranged along the outer peripheral edge 144 of the filter portion 120. The filter material 110 of the wavy bag portions 122 and the flange portion 140 at the four sides are made of the same nonwoven fabric of polyester fibers.

On the other hand, the wavy bag portions 122 of the filter portion 120 are formed of a wavy sheet 115 and the side sheets 126, and the wavy bag portions 122 and the flange portion 140 are monolithically or integrally molded. That is, the wavy sheet 115, the side sheets 126 and the flange portion 140 are monolithically molded.

Moreover, each wavy bag portion 122 is formed as a bag to extend in a groove shape having an internal wedge sectional view from the plane of the flange portion 140. The individual wavy bag portions 122 are juxtaposed in parallel to one another.

FIG. 15 is a sectional view of the filter 100, as taken in the longitudinal direction.

Figure 16A:
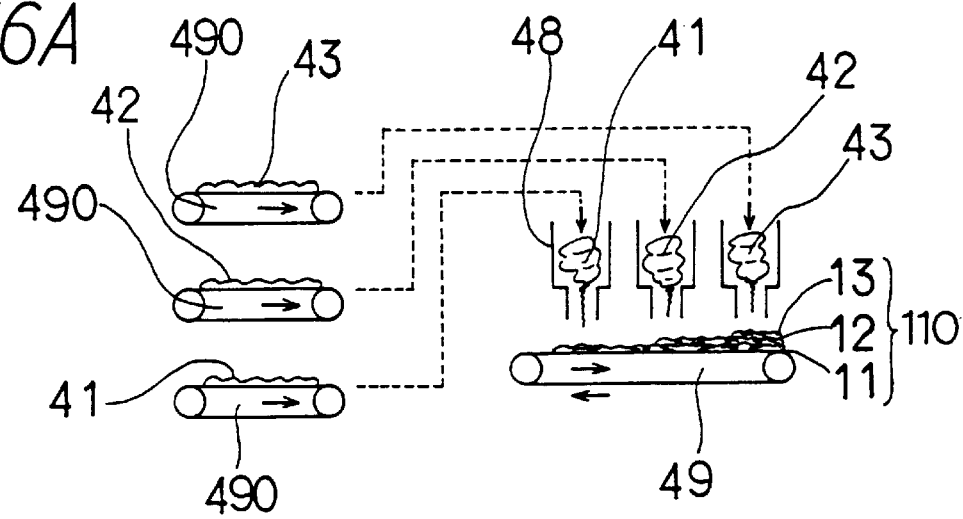
FIGS. 16A through 16C are schematic diagrams showing a process for manufacturing the element of FIG. 14.
Figure 16B:
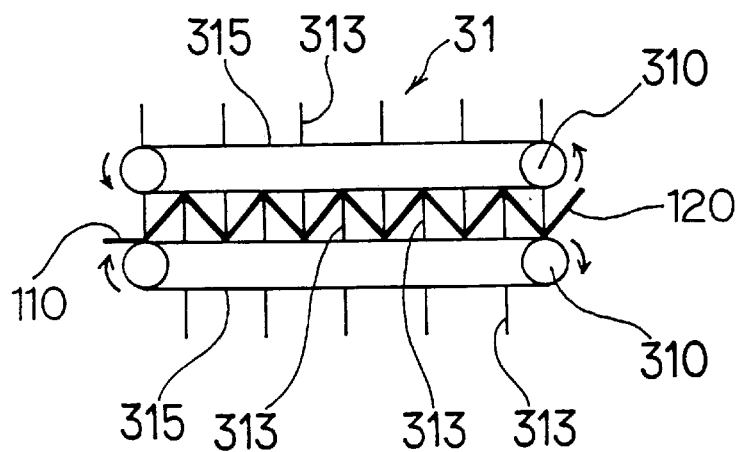
Figure 16C:
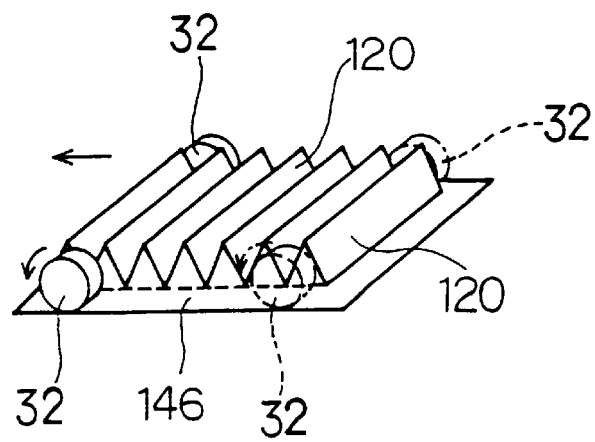

As shown in FIGS. 16A through 16C, the element of a fourth embodiment is manufactured by molding a first intermediate product without using any forming die.

Specifically, the manufacture process of the present embodiment comprises a wave shaping step of shaping a sheet of filter material fibers into a wavy sheet, a side closing step of pressing the two side portions of the wavy sheet to form a number of wavy bag portions, a fiber binding step of binding the filter material fibers of the wavy sheet, and a forming step of pressing the wavy sheet in vertical directions to form it into a desired filter shape.

The sheet is prepared by agglomerate filter material fibers of different thicknesses into a flat shape, as shown in FIG. 16A. Specifically, three kinds of different filter material fibers are conveyed on a moving sheet forming conveyor 49 so that the thinnest filter material fibers 11, the medium fiber material fibers 12 and the thickest filter material fibers 13 are laminated sequentially from the lowermost layer to the uppermost layer by using the air laying method. As a result, there is prepared the filter material 110 having the three-layered construction. In FIG. 16A, reference numerals 41, 42 and 43 designate material wads of the individual filter material fibers 11, 12 and 13, numeral 490 designates feed conveyors, and numeral 48 designates fiber feeders.

The filter material fibers 11 of the lowermost layer is composed of 30% of rayon of 1.5 deniers and 70% of rayon of 2 deniers and is fed at 80 to 199 g/m$^2$. The filter material fibers 12 of the medium layer is composed of 70% of polyester of 1.5 deniers and 30% of polyester of 2.5 deniers and is fed at 40 to 60 g/m$^2$. The filter material fibers 13 of the uppermost layer is composed of 60% of polyester of 2 deniers and 40% of polyester of 6 deniers and is fed at 25 to 45 g/m$^2$.

At the next wave shaping step, a waving machine 31 is fed at first with the aforementioned filter material 110, as shown in FIG. 16B. As a result, the filter material 110 is pleated as a whole into the wavy filter portion 120. After this, this wavy filter portion 120 is cut to a desired length.

The waving machine 31 is constructed of a pair of rolls 310 which have forming plates 313 erected at a suitable interval on belts 315.

At the aforementioned side closing step, as shown in FIG. 16C, the wavy filter portions 120 cut to have the desired length have their two side portions 146 pressed and flattened by rollers 32. As a result, the side portions of the wavy filter portion 120 are closed. On the other hand, the lower sides of the closed side portions leave the flange portion 140 (146) of the filter element 100.

As a result, by the process described above, there can be formed the first intermediate product having the general shape of the desired filter. Incidentally, at the time of closing the side portions, the wavy filter portion 120 is easily deformed, because it is still in a soft state, so that the wavy side portions 126 and the end sides 146 are formed.

Figure 17A:
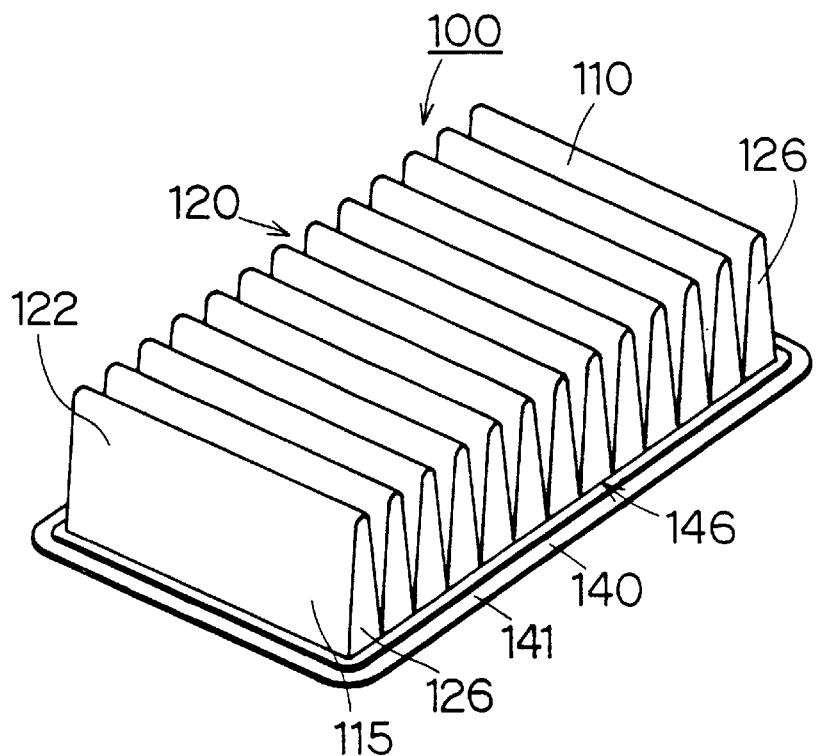
FIGS. 17A and 17B are perspective views of an element according to a fifth embodiment and a sectional view showing a portion of the element, respectively.
Figure 17B:
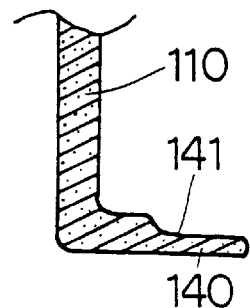

According to a fifth embodiment, as shown in FIGS. 17A and 17B, the flange portion 140 of the filter element 100 is thermally pressed.

Specifically, the filter element 100 is constructed of the filter portion 120 of the plurality of wavy bag portions 122, and the flange portion 140 arranged at the outer peripheral edge 146 of the filter portion 120. The filter material for the wavy bag portions 122 and the flange portion 140 is made integrally of nonwoven fabric of polyester fibers.

As shown in FIG. 17B, moreover, the flange portion 140 has its edge portion 141 thermally pressed to become thinner than the remaining portions of the flange portion 140.

In this filter element 100, the surface of the edge portion 141 has its surface roughness reduced to improve the flatness. Moreover, the edge portion 141 provides a portion at which it directly contacts with the clamping portions of the fluid filter so that it is clamped and fixed between the cap and the cover.

As a result, no clearance is established in the clamping portions when the element 100 is to be clamped by the cap and the cover of the fluid filter assembly. Thus, the filter 100 exhibits an excellent sealing property at its clamping portions.

Figure 18:
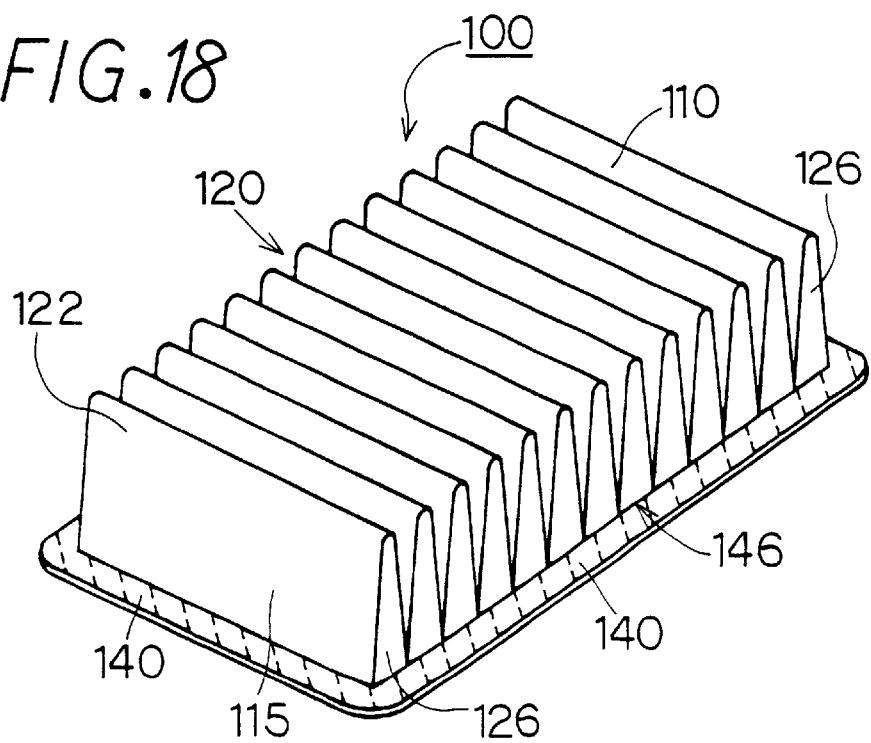
FIG. 18 is a perspective view showing an element according to a sixth embodiment.

As shown in FIG. 18, a sixth embodiment provides the element 100 which is composed of the flange portion 140 having a molten fiber layer.

Specifically, the element 100 is composed of the filter portion 120 having the plurality of wavy bag portions 122, and the flange portion 140 arranged at the outer peripheral edge 146 of the filter portion 120. The basic material of the wavy bag portions 122 and the flange portion 140 is made integrally of nonwoven fabric of polyester fibers.

Prior to the aforementioned monolithic or integrally molding, moreover, the flange portion 140 is impregnated with not only the aforementioned polyester fibers but also polyethylene resin fibers for forming the molten fiber layer. After the molding step, the flange portion 140 is thermally pressed as in the third embodiment. As a result, the polyethylene resin fibers are melted to form rigidly the molten fiber layer.

As a result, the flange portion 140 has its strength improved by the molten fiber layer to have an excellent flatness as in the third embodiment. Thus, the element 100 exhibits an excellent sealing property in the clamping portion of the fluid filter.

Figure 19A:
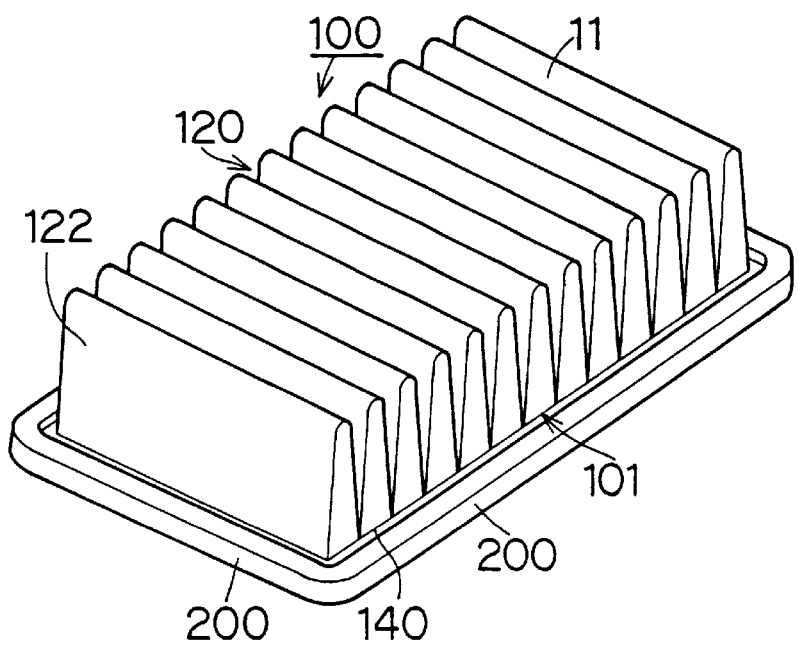
FIGS. 19A and 19B are perspective views showing an element according to a seventh embodiment and a sectional view showing a portion of the element.
Figure 19B:
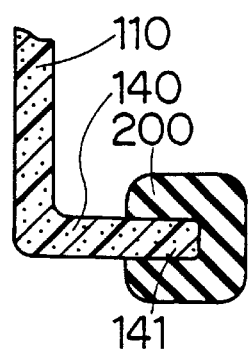

According to a seventh embodiment, as shown in FIGS. 19A and 19B, the flange portion 140 of the filter element 100 is equipped with a seal member 200 of rubber.

Specifically, the element 100 is composed, like the second embodiment, of the filter portion 120 of the plurality of wavy bag portions 122, and the flange portion 140 arranged at the outer peripheral edge 146 of the filter portion 120. The wavy bag portions 122 and the flange portion 140 are made of a basic material of nonwoven fabric of polyester fibers.

As shown in FIG. 19B, moreover, the edge portion 141 of the flange portion 140 is covered with the seal member 200 made of rubber.

As a result, the element 100 of the present embodiment can elastically seal the clamping portions of the fluid filter with the seal member 200. Thus, the filter 100 of the present embodiment exhibits an excellent sealing property between the clamping portions of case and the cap of the fluid filter.

Figure 20:
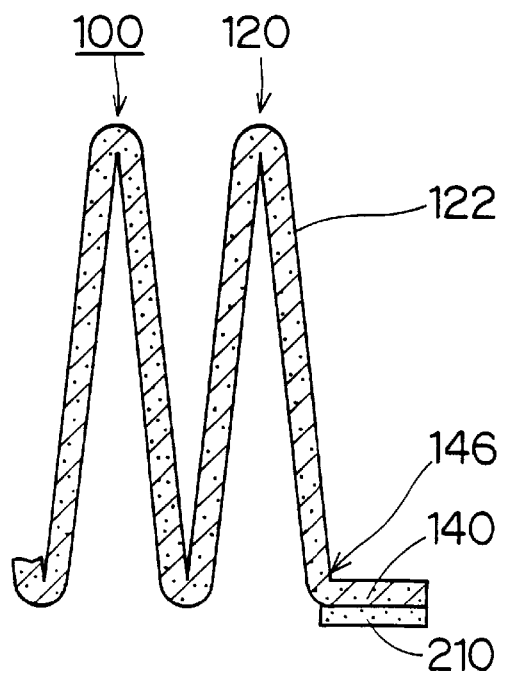
FIG. 20 is a sectional view showing a portion of an element according to an eighth embodiment.

As shown in FIG. 20, an eighth embodiment provides the element 100 having its flange portion 140 equipped with a felt fiber layer 210.

Specifically, the element 100 is composed of the filter portion 120 of the plurality of wavy bag portions 122, and the flange portion 140 arranged at the outer peripheral edge 146 of the filter portion 120. The wavy bag portions 122 and the flange portion 140 are made of a basic material of unwoven fabric of polyester fibers.

Moreover, the sheet-shaped felt fiber layer 210 is adhered to the flange portion 140. As a result, an excellent sealing property is exhibited at the clamping portions of the fluid filter.

As shown in FIGS. 21 and 22, the element thus far described is used in an air filter having projections 28 on the clamping portions 165 of the case 161.

As shown in FIG. 21, this air filter 160 is composed, as in the first embodiment, of the case 161 for mounting the filter element 100, and the cap 162 for covering the case 161. Moreover, these case 161 and cap 162 are formed with the clamping portions 165 and 166 for clamping the flange portion 140 of the element 100 together.

As shown in FIG. 22, the clamping portion 165 of the case 161 is formed with the projections 28, and the clamping portion 166 of the cap 162 facing the former clamping portion 165 is formed with recesses 280 for fitting the projections 28 therein, so that the flange portion 140 of the element 100 is clamped between the projections 28 and the recesses 280 tightly.

The state of the flange portion 140 at the clamping portions 165 and 166 is shown by broken lines in FIG. 22. Specifically, the projections 28 and the recesses 280 can fix the clamped positions of the flange portion 140 while partially deforming the flange portion 140.

As a result, the clamping portions 165 and 166 of the fluid filter of the present embodiment can firmly clamp the flange portion 140 of the element 100.

As shown in FIGS. 23 and 24, the element thus far described is also used in the air filter 160 having a slippage stop member 285 on the clamping portion 165 of the case 161.

Specifically, the air filter 160 of the present embodiment is composed, as shown in FIG. 23, of the case 161 and the cap 162 for covering the case 161 as in the first embodiment. Moreover, the case 161 and the cap 162 are respectively formed with the clamping portions 165 and 166 for clamping the flange portion 140 of the element 100.

As shown in FIG. 24, both the clamping portions 165 and 166 are equipped with the slippage stop members 285 made or rubber. Moreover, the filter 100 has its flange portion 140 clamped by the clamping portions 165 and 166 through the slippage stop members 285.

As a result, the clamping portions 165 and 166 of the air filter 160 of the present embodiment have an excellent sealing property so that they can firmly clamp the flange portion 140.

Figure 25:
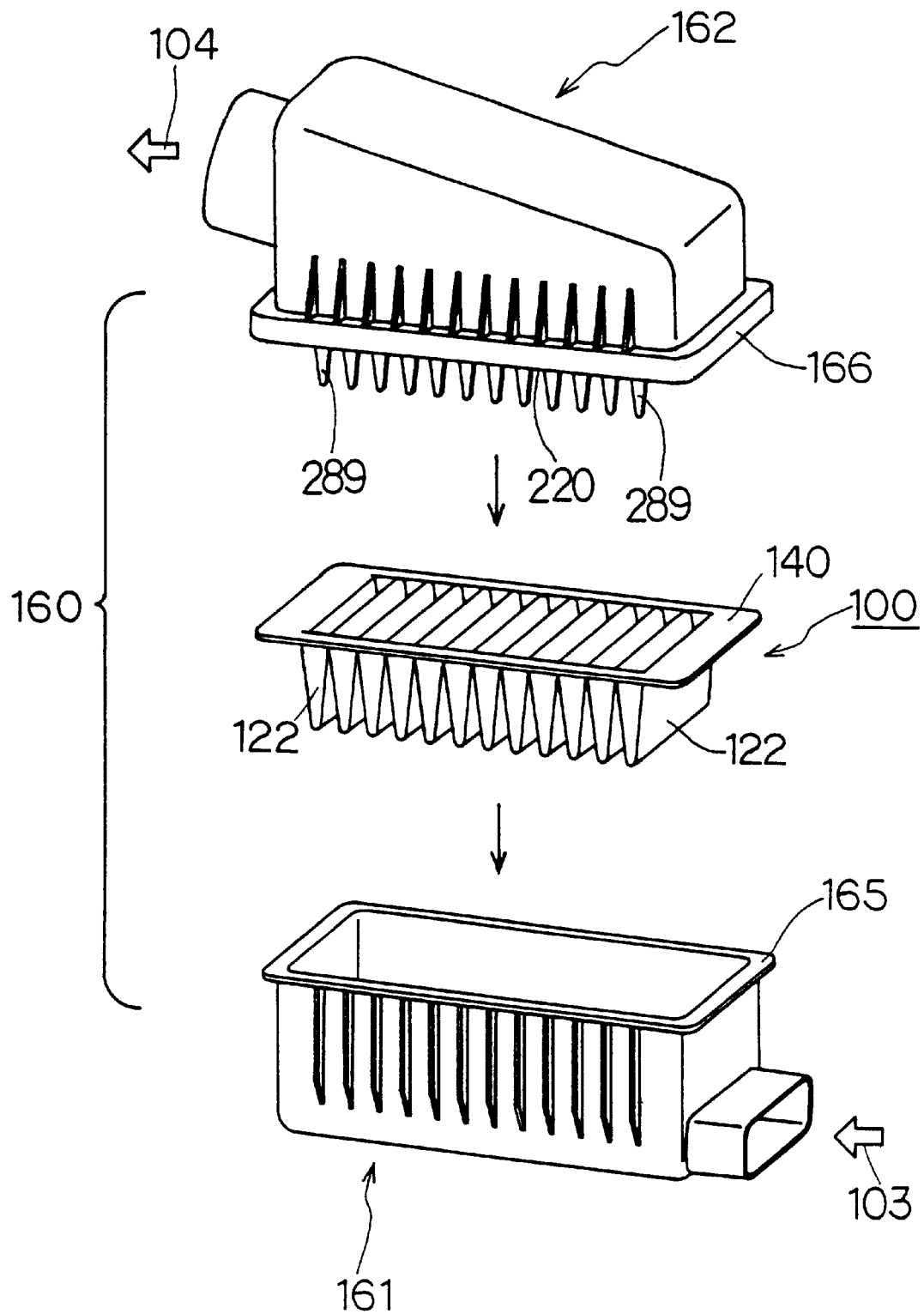
FIG. 25 is an exploded perspective view showing an air cleaner using the element of the present invention.

As shown in FIG. 25, the element 100 thus far described may be used in the air filter 160 having projecting support members 289 for supporting the element 100 on the inner wall 220 of the cap 162.

Specifically, as shown in FIG. 25, the air filter 160 of the present embodiment is also constructed of the case 161 for mounting the element 100, and the cap 162 for covering the case 161.

Moreover, the case 161 and the cap 162 are respectively equipped with the clamping portions 165 and 166 for clamping the flange portion 140 of the element 100.

Moreover, the inner wall 220 of the cap 162 is equipped with the comb-shaped projecting support members 289 for individually supporting the wavy bag portions 122 of the element 100.

In this air filter 160, the air flows from the case 161 to the cap 162, as indicated from arrow 103 to arrow 104. As a result, the air pressure is always applied to the wavy bag portions 122 upward in the figure. As a result, the projecting support members 289 support the leading ends of the wavy bag portions 122 so that they can prevent the wavy bag portions 122 from being deformed by the air pressure.

Moreover, the seals between the element 100 and the case 161 and the cap 162 may become insufficient according to the deformation of the element 100. However, this deformation of the element 100 can be prevented by preventing the deformation of the wavy bag portions 122.

What is claimed is:

1. A process for manufacturing a filter element comprising steps of:
    producing a filter material including thermally melting adhesive fibers;
    shaping the filter material into a wavy sheet having a plurality of repeating, spaced-apart ridges which are juxtaposed to one another;
    pressing side portions of the wavy sheet to provide flat side wall portions with the ridges being closed at the sides thereof and extending between the side wall portions; and
    folding edges of the side wall portions and pressing and heating the edges of the side wall portions to provide a flange portion extending along a mounting plane around the plurality of ridges for maintaining a shape of said wavy sheet, said flange portion extending from said wavy sheet integrally and being made of the same filter material as said wavy sheet, the adhesive fibers in the side wall portions being melted so that the flange portion has a thickness that is thinner than that of the ridges and a fiber density that is higher than that of the ridges.

2. The process as in claim 1, wherein the side portions are heated while pressing the side portions to melt the adhesive fibers therein so that the side wall portions have a thickness that is thinner than that of the ridges and a fiber density that is higher than that of the ridges.

3. The process as in claim 1, further comprising reinforcing a top portion of each of the ridges by pressing and heating each top portion to melt the adhesive fibers in each top portion so that each top portion has a thickness that is thinner than other parts of the ridge and a fiber density that is higher than the other parts of the ridge.

4. The process as in claim 1, further comprising the steps of:
    folding edges of the wavy sheet other than the edges of the side wall portions to form second folded edges; and
    pressing and heating the second folded edges to melt the adhesive fibers therein so that the second folded edges form a flange portion integral with the flange portion of the side wall portion and having a thickness that is thinner than that of the ridges and a fiber density that is higher than that of the ridges.

5. The process as in claim 1, wherein the side portions pressing step and the pressing and heating step includes placing the wavy sheet between an upper die and a lower die and then moving closely the upper die and the lower die in a direction perpendicular to the wavy sheet while heating at least one of the dies.

6. The process as in claim 1, wherein the side portions pressing step and the pressing and heating step are performed simultaneously by rolling rollers on the side portions of the wavy sheet in a direction of the plurality of ridges.

7. The process as in claim 1, wherein the filter material is a mixture of different fibers including main fibers as well as the adhesive fibers, the main fibers having a higher melting point than the adhesive fibers.

8. The process as in claim 7, wherein the edges of the side wall portions are heated to a temperature between melting points of the main fibers and the adhesive fibers to melt only the adhesive fibers.

9. The process as in claim 8, further comprising reinforcing a top portion of each of the ridges by pressing and heating each top portion to a temperature higher than the melting point of the main fiber to melt both the main fibers and the adhesive fibers in each top portion so that each top portion has a thickness that is thinner than other parts of the ridges and a fiber density that is higher than the other parts of the ridges.

10. The process as in claim 4, further comprising attaching a layer of material other than the filter material along the flange portions surrounding the side wall portions and the ridges.

11. The process as in claim 5, wherein the lower die includes a plurality of spaced-apart projecting plates arranged in parallel which conform to the plurality of ridges formed in the filter material when the filter material having the plurality of ridges formed therein is placed in the lower die and wherein the upper die includes a plurality of grooves arranged in parallel and having a shape that is complementary to the projecting plates of the lower die and having a width that is less than the width of the plurality of spaced-apart ridges.

12. The process as in claim 1 wherein, during the shaping step, the plurality of ridges are formed in a middle portion of the filter material with each of the ridges extending transversely across the filter material from one side thereof to an opposite side thereof, while leaving opposite end portions of the filter material un-shaped.

13. The process as in claim 2, further comprising reinforcing a top portion of each of the ridges by pressing and heating each top portion to melt the adhesive fibers in each top portion so that each top portion has a thickness that is thinner than other parts of the ridge and a fiber density that is higher than the other parts of the ridge.

14. The process as in claim 1, wherein the filter material is produced so as to include a three-layer laminated construction wherein a lowermost layer is formed primarily from thinnest material fibers, an intermediate layer is formed primarily from fibers having medium thickness, and an uppermost layer is formed primarily from thickest material fibers.

15. The process as in claim 14, wherein:
the lowermost layer is formed to have a composition of 30% rayon of 1.5 deniers and 70% rayon of 2.0 deniers and the fibers of the lowermost layer are fed at a rate of 80–199 g/m$^2$;
the intermediate layer is formed to have a composition of 70% polyester of 1.5 deniers and 30% polyester of 2.5 deniers and the fibers of the intermediate layer are fed at a rate of 40–60 g/m$^2$; and
the uppermost layer is formed to have a composition of 60% polyester of 2.0 deniers and 40% polyester of 6.0 deniers and the fibers of the uppermost layer are fed at a rate of 25–45 g/m$^2$.

16. The process as in claim 1 further including the step of adding a rubber seal member covering an edge portion of the flange portion.

17. The process as in claim 1 further including the step of adhering a felt fiber layer to the flanged portion.

18. A process for manufacturing a filter element comprising steps of:
producing a filter material including main fibers and adhesive fibers;
pleating the filter material into a wavy sheet having a plurality of repeating, spaced-apart ridges which are juxtaposed to one another;
placing the wavy sheet between a pair of dies each having a first and a second wall disposed in a generally perpendicular arrangement with respect to each other;
heating the dies to a temperature to melt the adhesive fibers; and
moving the dies closely to each other to compress side portions of the plurality of ridges by the respective first walls of the pair of dies, so that the ridges are closed at the sides thereof and to then compress side edges of the compressed side portions of the ridges by the respective second walls, so that the compressed side edges provide a flange that surrounds the ridges and the compressed side portions along a mounting plane around the plurality of ridges for maintaining a shape of the wavy sheet, said flange extending from said wavy sheet integrally and being made of the same filter material as said wavy sheet and having a thickness that is thinner than that of the ridges and a fiber density that is higher than that of the ridges.

19. The process as in claim 18, wherein the flange portion includes a folded layer structure of the wavy sheet.

20. The process as in claim 18, further comprising the step of reinforcing a top portion of each of the ridges by pressing and heating each top portion to melt the adhesive fibers in each top portion so that each top portion has a thickness that is thinner than other parts of the ridges and a fiber density that is higher than other parts of the ridges.

21. The process as in claim 20, wherein each top portion is heated to a temperature to melt both the adhesive fibers and the main fibers in each top portion.

22. The process as in claim 18, further comprising the step of reinforcing a central part of each of the ridges in a direction of repetition of the plurality of ridges by pressing and heating the central part to melt the adhesive fibers in the central part so that the central part has a thickness that is thinner than other parts of the ridges and a fiber density that is higher than the other parts of the ridges.

23. A process for manufacturing a filter element comprising steps of:
producing a filter material sheet including a plurality of kinds of fibers;
pleating the filter material into a wavy sheet having a plurality of repeating, spaced-apart ridges which are juxtaposed to one another;
compressing side portions of the wavy sheet to provide side walls integrally extending from the wavy sheet so that the side walls are provided perpendicular to the plurality of ridges and so that the ridges are closed at the sides thereof and folding portions of the side walls to provide a flange that is perpendicular to the side walls, said flange extending along a mounting plane around the plurality of ridges for maintaining a shape of said wavy sheet, said flange extending from said wavy sheet integrally and being made of the same filter material as said wavy sheet; and
heating and pressing the flange to have a thickness that is thinner than that of the ridges and a fiber density that is higher than that of the ridges, thereby increasing rigidity of the flange and fixing a shape of the ridges.

24. The process as in claim 23, wherein:
the fibers include main fibers and adhesive fibers having a lower melting point than the main fibers; and
the compressing step and the heating step are performed simultaneously by a pair of heated dies by placing the wavy sheet between the heated dies and pressing only the side portions of the wavy sheet by the heated dies.

25. The process as in claim 23, wherein the compressing step is performed by rollers that run only on the side portions of the wavy sheet.

26. The process as in claim 25, wherein the heating step includes compressing an outer periphery of the flange.

27. The process as in claim 25, wherein the filter material sheet has a plurality of layers, a lower layer being made of thin fibers and an upper layer being made of thick fibers.

* * * * *